Jan. 18, 1949.    R. C. SANDERS, JR    2,459,457
COMPARATOR CIRCUITS FOR RADIO LOCATORS
Filed March 20, 1944    4 Sheets-Sheet 3
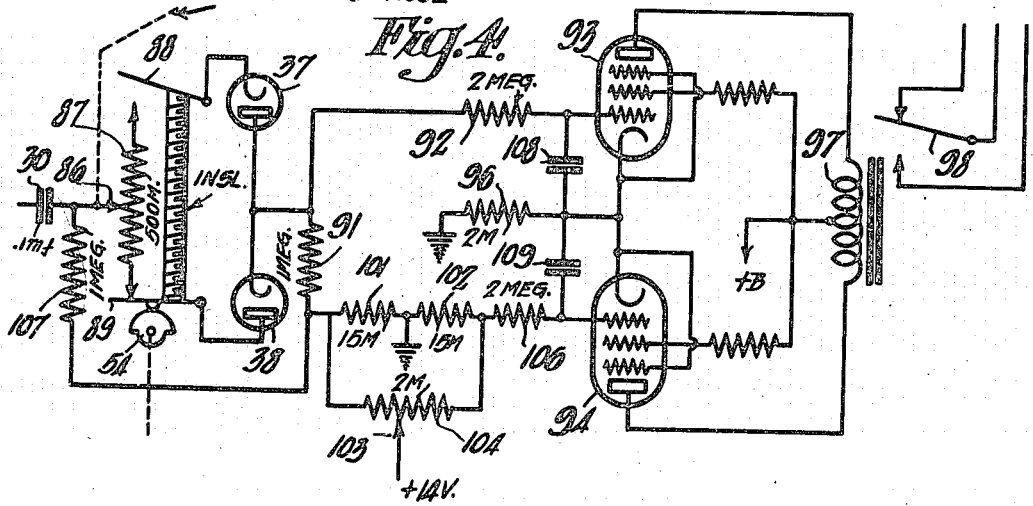
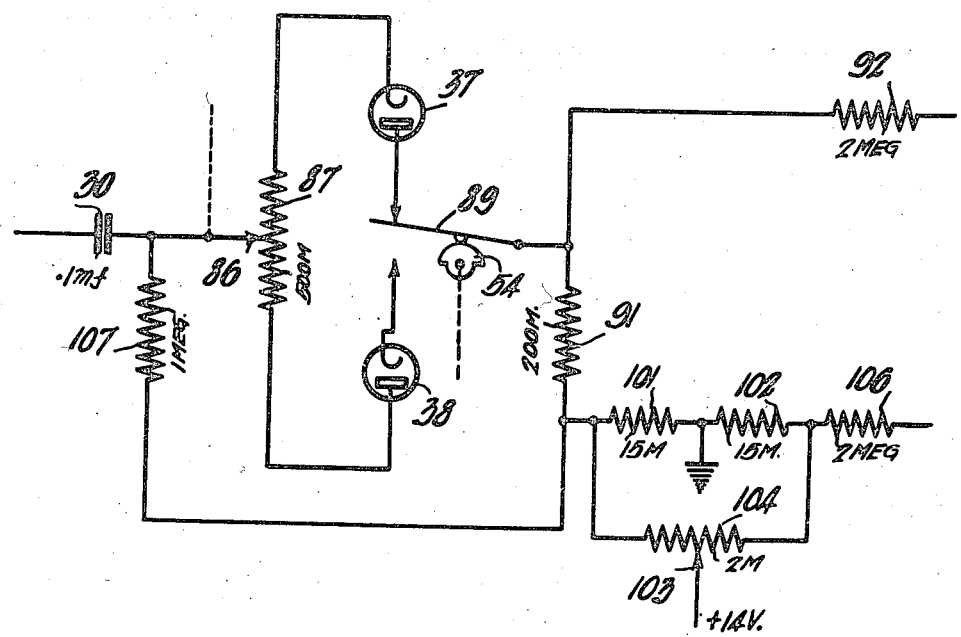
INVENTOR.
Royden C. Sanders, Jr.
BY
ATTORNEY

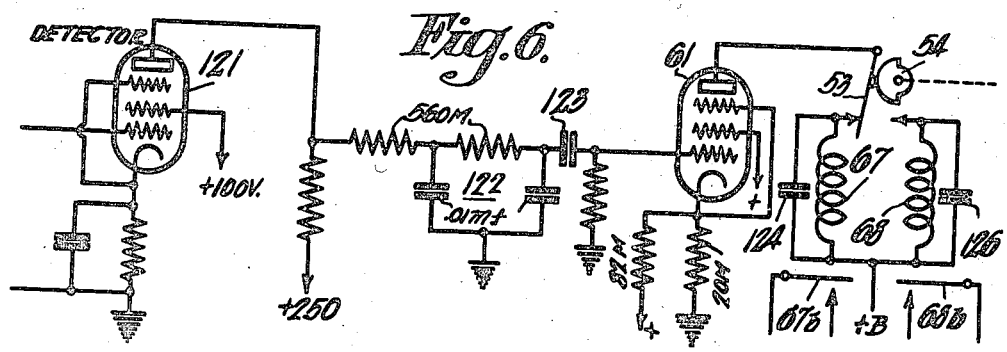
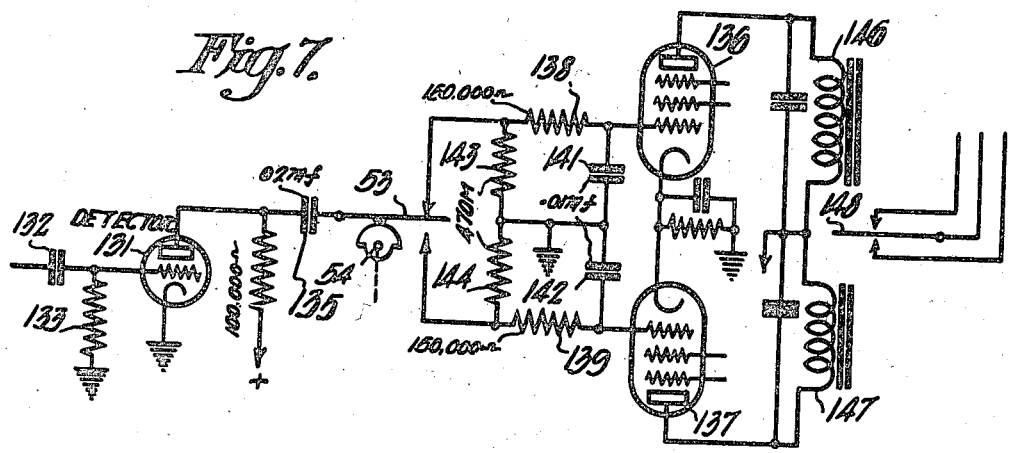

Patented Jan. 18, 1949

2,459,457

UNITED STATES PATENT OFFICE 2,459,457

COMPARATOR CIRCUITS FOR RADIO LOCATORS

Royden C. Sanders, Jr., Hightstown, N. J., assignor to Radio Corporation of America, a corporation of Delaware Application March 20, 1944, Serial No. 527,292

16 Claims. (Cl. 343—7)

My invention relates to radio locator apparatus. It relates particularly to comparator circuits for comparing the amplitudes of reflected signals that are received during successive antenna switching periods in a system employing a directive antenna system that has its region of maximum field strength angularly displaced at the switching rate, and to systems utilizing such comparator circuits for directing an object in flight toward a target or other signal reflecting object.

The invention will be described specifically as applied to a locator system of the frequency-modulated type having left-right directive antennas positioned to have overlapping radiation patterns. The invention will also be described as applied for automatic left-right or rudder control of an airplane carrying the radio locator system.

An object of the invention is to provide an improved method of and means for obtaining in radio locator apparatus a signal that is representative of or proportional to the angular amount by which the locator antenna system fails to point directly toward a target or other reflecting object.

Another object of the invention is to provide an improved method of and means for causing a directive antenna system automatically to be pointed towards a target or other reflecting object.

Another object of the invention is to provide an improved radio locator system in which directive antennas are switched successfully to the locator system for obtaining directional information.

Still another object of the invention is to provide an improved control system for an aircraft in which reflected radio signals automatically control its direction of travel.

Figure 1:
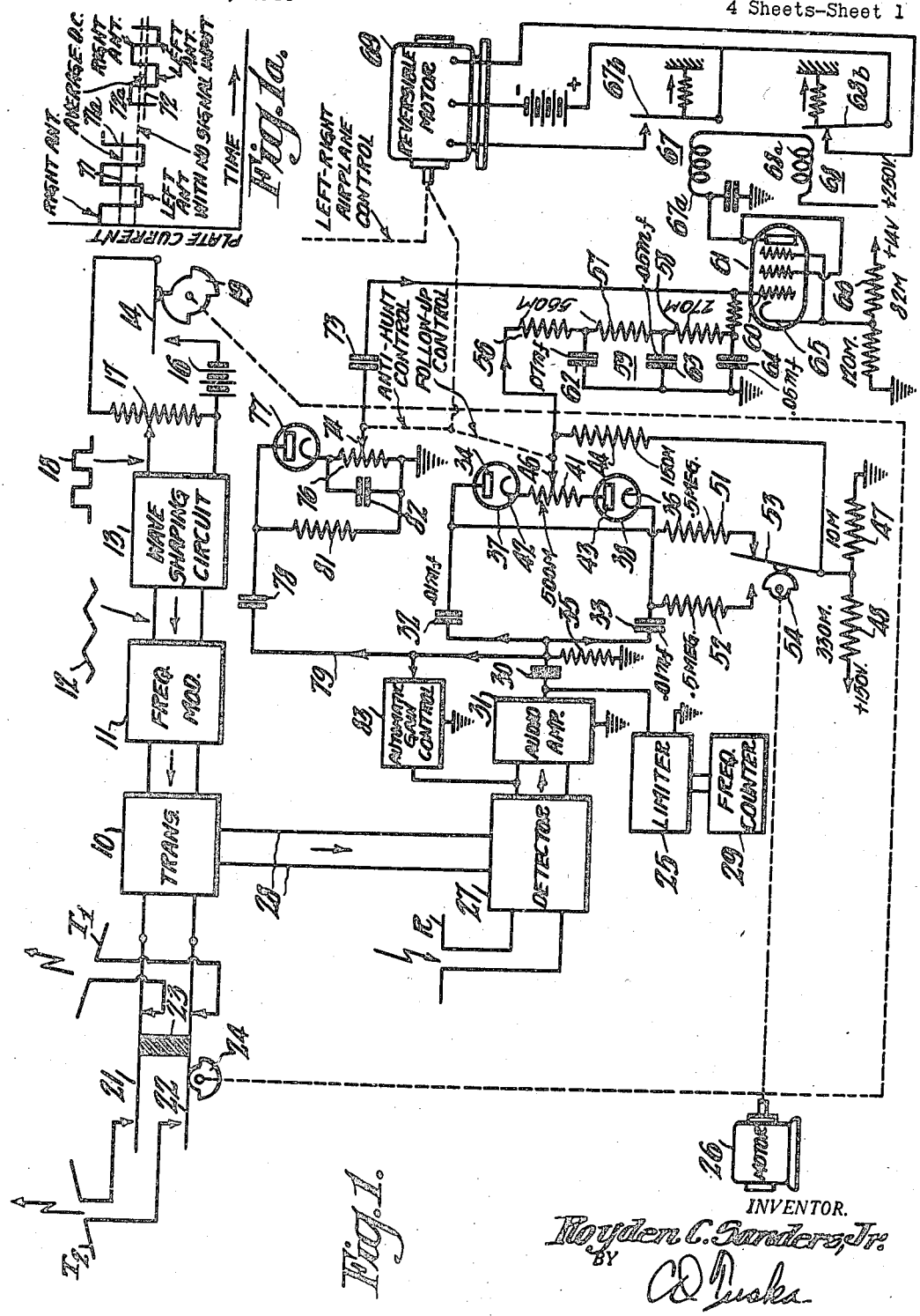
Figure 2:
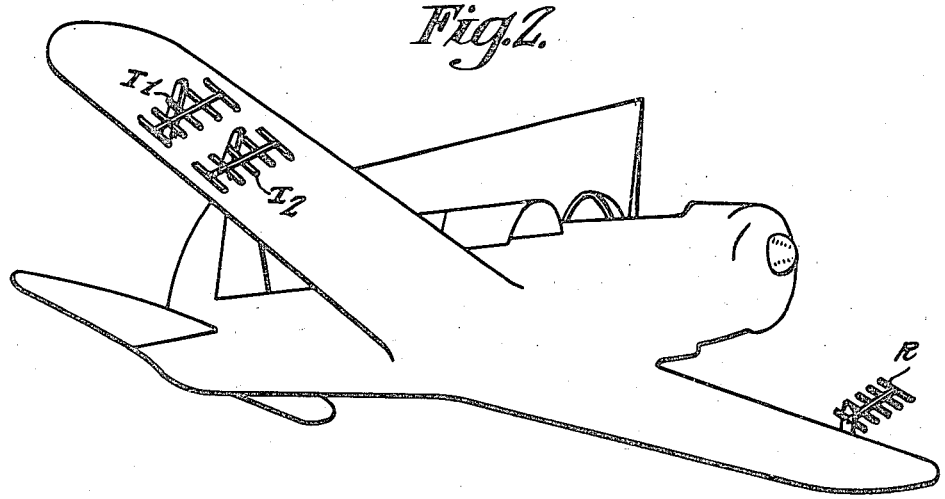
Figure 3:
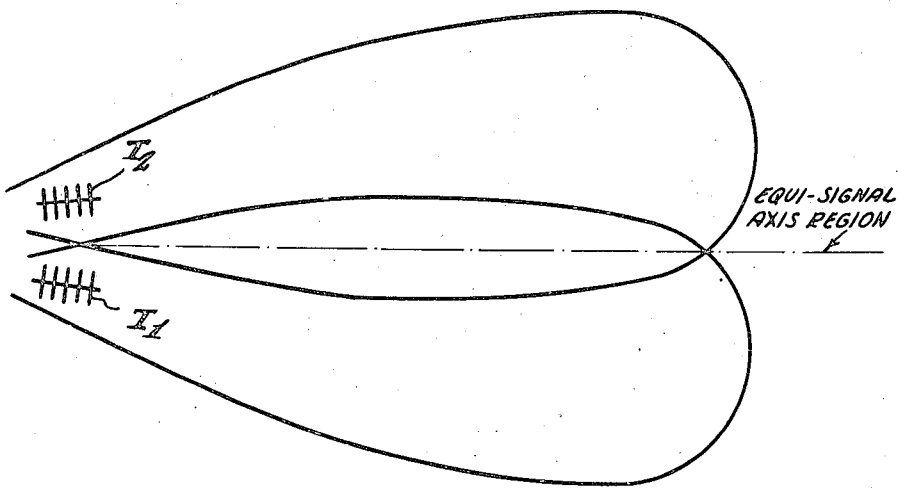

Figure 1 is a block and circuit diagram of a radio locator system embodying the invention, Figure 1a is a group of graphs that are referred to in explaining the invention, Figure 2 is a view in perspective of an airplane showing a method of mounting antennas for the system of Fig. 1, Figure 3 is a view showing the directional radiation patterns of the transmitting antennas for the system of Fig. 1, and Figures 4 to 7, inclusive, are circuit diagrams of left-right switching or comparator circuits that may be substituted for the one illustrated in Fig. 1.

In the several figures, similar parts are referred to by similar reference characters.

Fig. 1 shows one embodiment of the invention applied to a frequency modulated radio locator system comprising a radio transmitter 10 which is cyclically frequency modulated by a suitable frequency modulator 11, such as a variable capacitor unit, which has a modulating signal 12 applied thereto from a wave shaping circuit 13. In the example illustrated the modulating signal 12 is of triangular wave shape but it may be of some other wave form such as sinusoidal or sawtooth.

The triangular wave 12 may be produced by opening and closing a switch 14 in series with a battery 16 and a potentiometer resistor 17. This generates a square wave voltage 18 that is applied to the wave shaping circuit 13 to obtain the triangular voltage 12. In this case the shaping circuit 13 may be merely an integrating circuit. The switch 14 is operated by a motor driven cam 19. If desired, the wave shaping circuit and modulator described in application Serial No. 512,153, filed November 29, 1943, now Patent No. 2,445,014, issued July 13, 1948, filed in the name of Irving Wolff, and entitled Vibratory mechanical systems, may be employed.

The output of the transmitter 10 is radiated alternately from a pair of left-right directive antennas T₁ and T₂. This is accomplished by means of a suitable switch which, in the illustration, comprises switch arms 21 and 22 connected together mechanically by a block 23 of insulating material. The switch arms 21 and 22 are actuated by a cam 24 driven by a motor 26. Instead of switching the transmitter antennas, a pair of directive receiving antennas may be switched, if preferred. Also, other known means of shifting the antenna system directivity may be employed in place of the means described.

After reflection from a target, the frequency-modulated signals are received by a directive antenna R and supplied to a beat frequency detector 27. The frequency-modulated signals are also supplied to the detector 27 over a line 28 directly from the transmitter 10 whereby the beat frequency of the detector output is proportional to the distance to the target as is well known in the art. This distance may be indicated by a frequency counter 29 supplied with signal through an amplitude limiter 25.

For obtaining directional information, output signal from the detector 27 is also supplied to an audio frequency amplifier 31 and the amplified output is applied through a coupling capacitor 30 and through capacitors 32 and 33 to the anode 34 and the cathode 36, respectively, of a pair of rectifiers such as diodes 37 and 38. The input terminals of capacitors 32 and 33 are provided with a direct-current path to ground through a resistor 35.

The received signals contain directional information because the amplitudes of the signals received during radiation from the right and left antennas $T_1$ and $T_2$, respectively, will not be equal unless the pair of antennas are pointing directly toward the reflecting target. This fact is apparent from Fig. 3 which shows the overlapping radiation patterns of the directive antennas $T_1$ and $T_2$. The overlapping patterns have an equisignal axis region as indicated by the broken line. The antennas $T_1$ and $T_2$ may be the well known Yagi type. Fig. 2 shows them mounted on the under side of one of the wings of an airplane carrying the equipment shown in Fig. 1. The receiving antenna R may be mounted on the upper side of the other wing as illustrated. Other types of antennas and other methods of mounting them may be preferred in some instances.

Referring again to the left-right control portion of Fig. 1, the diodes 37 and 38 have a resistor 41 connected between their cathode 42 and anode 43. An output resistor 44 is connected between a variable tap 46 on the resistor 41 and a positive potential point on a voltage divider comprising resistors 47 and 48.

The junction point of the capacitor 32 and the diode anode 34 and the junction point of the capacitor 33 and the diode cathode 36 are connected alternately through resistors 51 and 52, respectively, to ground through the portion 47 of the voltage divided 47, 48 by means of a switch 53. Thus, either of the diodes 37 or 38 is operative according to the position of the switch 53. The switch 53 is actuated by a cam 54 that is driven by the motor 26 in synchronism with the antenna switching.

The output resistor 44 has its high voltage end direct-current connected through filter resistors 56, 57 and 58 of a filter 59 to the control grid 60 of an amplifier tube 61. The filter 59 also comprises shunt capacitors 62, 63 and 64 which are connected from the filter resistors to ground, the filter values being such as to smooth out current varying at the switching rate. The cathode 65 of amplifier 61 is connected to a point on a voltage divider 66 which together with the bias from divider resistors 47 and 48 holds the tube 61 properly biased for amplifier operation.

The direct-current output of the amplifier tube 61 flows through the relay coils 67a and 68a of two marginal relays 67 and 68 having switch arms 67b and 68b, respectively, connected to make a reversible motor 69 run in one direction or the other, depending upon which relay is closed, to turn the airplane in one direction or the other. The relays 67 and 68 and the bias of tube 61 are so adjusted that when there is no received signal, and also when the antennas $T_1$ and $T_2$ point directly toward the target, both relays are open. If the D.-C. output of tube 61 increases above this "neutral" D.-C. current value, one relay closes while the other remains open and the motor 69 runs in one direction to turn the airplane in one direction; if, on the other hand, the D.-C. output decreases below this "neutral" value, the other relay remains open, and the motor 69 runs in the other direction to turn the airplane toward the opposite direction.

The operation of the circuit for obtaining the above described relay action will now be considered.

A voltage which is alternately more positive and less positive (that is, a square wave voltage) is produced across the output resistor 44 by causing current to flow through one diode (diode 37 in the example illustrated) when the right antenna $T_1$ is connected to the transmitter 10 and by next causing current to flow through the other diode (diode 38 in this example) when the left antenna $T_2$ is connected to the transmitter 10. This voltage becomes substantially a direct-current voltage after filtering by the filter 59.

The diode switching is accomplished by the blocking action of the coupling capacitors 32 and 33 and by the unblocking action of the switch 53 which permits the direct-current charges on capacitors 32 and 33 (produced by a flow of diode current) to leak off quickly through the resistors 51 and 52, respectively. This will be seen by following through a cycle of operation as follows: With the switch 53 in the position shown, any blocking charge that has been on the capacitor 32 has leaked off through the resistor 51; therefore, the received signal during this antenna switching period appears across resistor 51 and rectified current will flow through the diode 37 and through the resistors 41 and 44 in a direction to make the high voltage end of resistor 44 more positive. Meanwhile there is no current flow through the diode 38 because, as soon as the switch 53 disconnected the resistor 52, the capacitor 33 blocked due to a momentary flow of rectified current through the diode 38.

Next, when the left antenna $T_2$ is connected to the transmitter 10, the switch 53 is moved to the left to disconnect resistor 51 to connect resistor 52 to ground through the resistor 47 whereby the received signal during this switching period appears across the resistor 52. Current now flows through the diode 38. The path of current flow may be traced from the low potential end of resistor 52, through the resistors 44 and 41, and through the diode 38 back to the high potential end of the resistor 52. It will be seen that this current flow through the output resistor 44 is in the direction to make its high potential end more negative during the left antenna switching period.

As previously stated, the above-described diode switching in synchronism with the antenna switching results in a square wave voltage at the input of the filter 59. The voltage on the grid 60 of tube 61, therefore, is the D.-C. voltage component of the square wave voltage plus the direct-current bias voltage. It is evident that the average plate current of tube 61 will depend upon the relative amplitudes of the positive and negative half cycles of the square wave voltage with respect to ground. This is illustrated in Fig. 1a where the graphs 71 and 72 shows the D.-C. components of the plate current of the tube 61 corresponding to the square waves 71a and 72a at the input of filter 59 for the conditions of the antenna system pointing to the left of target and pointing to the right of target, respectively.

From the foregoing, it will be evident that the marginal relays 67 and 68 may be made to respond to the average plate current as previously described so that the correct relay will close to make the motor 69 run in one direction or the other if the received signal during radiation from one antenna differs in amplitude from that received during radiation from the other antenna. When the received signal becomes of the same strength during both antenna switching periods, both of the relays 67 and 68 open and the motor 69 stops.

In the system shown in Fig. 1, the frequency modulation sweep and the antenna switching are synchronized so that there is one complete cycle of frequency modulation during each antenna switching period. It has been found that there should be such synchronization for good operation unless the system is designed to have a large number of frequency modulation sweeps during each switching period. The synchronization may be obtained as shown in Fig. 1 by employing the square wave producing circuit 14, 16, 17 and by driving the switch cam 19 from the same motor 26 that operates the antenna switch 21, 22. At the beginning of the upsweep of each triangular wave 12, one of the transmitter antennas is connected to the transmitter 10.

In some cases it may be desirable to employ a follow-up control to prevent the airplane from being turned first too far to the right and then too far to the left. Such action may be prevented by connecting the adjustable tap 46 of the resistor 41 to the motor 69 so that, as the airplane is turned toward one direction, the tap 46 is moved along resistor 41 until the average D.-C. voltage across resistor 44 is zero, and neither the right or left relay is closed and hence the motor 69 stops moving. The amount that the motor 69 moves from its center position and hence the rate of turn of the airplane is therefore a function of the ratio of right to left signal and hence the number of degrees off course of the airplane. It will be apparent that if there is more "right" signal through diode 37 than "left" signal through diode 38, the amount of control by the "right" signal will be reduced as desired while the airplane is turning toward the desired direction if the tap 46 is being moved toward the anode end of resistor 41 during this time. More specifically, moving the tap 46 toward the diode 38 decreases the right antenna half cycle (positive half cycle) and increases the left antenna half cycle (negative half cycle) of the square wave applied to the amplifier 61.

Thus by means of the balancing bridge action of the motor 69 and the potentiometer 41, the airplane's rate of turn is always proportional to the degrees off course of the airplane with respect to the target. If the follow-up ratio of rate of turn of the airplane to the degrees off course is made small enough, hunting of the airplane will be prevented. It will be evident that the motor 69 reverses and begins moving the rudder back to its center or neutral position before the airplane has been turned enough to point the antennas T₁ and T₂ directly toward the reflecting target. By the time the antennas T₁ and T₂ are pointing directly toward the target, the rudder is back to its neutral position.

It is apparent that the filter 59 will introduce a time lag in the transfer of a voltage change from the follow-up tap 46 to the grid 60 of the amplifier tube 61. This lag may be great enough to adversely affect the operation of the follow-up circuit since the control information appearing at the tap 46 should be conveyed almost instantly to the motor 69 or it may hunt. Also, there will be a certain amount of time lag in the response of mechanical parts of the system as, for example, in the relays 67 and 68 that may give the motor 69a tendency to hunt.

The adverse effects of such time lags may be avoided by applying to the grid 60 of the tube 61, through a capacitor 73, a voltage that has an amplitude and a polarity dependent upon the speed and direction of rotation of the motor 69. Such a voltage may be obtained from a variable tap 74 which is coupled to the motor 69 so that when the motor rotates, the tap 74 moves either up or down on a voltage divider resistor 76 according to the direction of rotation of the motor 69. When the motor 69 rotates in the direction to move the follow-up tap 46 toward the diode 38, thus decreasing the average anode current of tube 61, the tap 74 is moved down towards the negative end of resistor 76 to also decrease the average D.-C. output of tube 61. The voltage change at the tap 74 will be transferred to the grid 60 of tube 61 with substantially no delay and, therefore, will be effective in controlling the motor 69 before the voltage change at tap 46 becomes effective at the motor 69.

It will be understood that the voltage applied to the grid 60 through the capacitor 73 is proportional to the rate of change of voltage at the tap 74 (and, therefore, proportional to the motor speed) and that it reverses in polarity when the direction of motion of the tap 74 reverses.

A constant voltage may be maintained across the resistor 76, as by means of a battery (not shown), or this voltage may be made to increase in response to an increase in the strength of the received signal by means of the circuit illustrated. As illustrated, the resistor 76 is supplied with rectified signal from the output circuit of the audio amplifier 31 by means of a diode 77 which is connected to said output circuit through a coupling capacitor 78 and through a connection 79. A leak resistor 81 and a filter capacitor 82 are provided for the capacitor 78 and the resistor 76, respectively.

If there is a decrease, for example, in the strength of the received signal while the motor 69 is rotating in a direction to move the taps 46 and 74 downwardly, this results in an immediate decrease in the negative voltage applied to the grid 60 through the capacitor 73 so long as the signal strength is decreasing. This immediately increases the D.-C. output of the tube 61 and compensates for the fact that this same decrease in signal strength caused an increase in the direct-current voltage component at the input of the filter 59 (as explained below) which will appear at the filter output only after a certain time delay to increase the D.-C. output of tube 61. Unless the effect of the time delay is overcome, as described above for example, the changes in strength of received signal will give the motor 69 a tendency to hunt.

An automatic gain control circuit 83 preferably is provided for the audio amplifier 31. If an automatic gain control circuit is not provided and the signal strength becomes so large that limiting occurs in the audio amplifier, then the output of the audio amplifier will be a signal that looks as though the antenna is pointed toward the target regardless of its direction with respect to the target.

In Figs. 4 to 7 there are shown other left-right switching circuits that may be substituted for the switching circuit shown in Fig. 1. In Fig 4, the audio signal is supplied through the coupling capacitor 30 and through an adjustable tap 86 on a resistor 87 to either the diode 37 or the diode 38 depending upon which one of the switch arms 88 and 89 is held closed by the cam 54.

The diodes 37 and 38 have an output resistor 91 that has its high potential end connected through a filter resistor 92 to the control grid of an amplifier tube 93. A second amplifier tube 94 is driven by a balanced tube connection comprising a cathode load resistor 96 so that the tubes 93 and 94 operate in push-pull to operate a differential relay having a coil 97 that actuates a switch arm 98 for controlling the motor 69 (Fig. 1). If the direct-current outputs of the tubes 93 and 94 are equal, the switch arm 98 is in its center position and the motor 69 is not energized. Otherwise, the motor 69 is driven in one direction depending upon the position of the switch arm 98.

The tubes 93 and 94 are balanced for equal output in the absence of an incoming signal (and for the condition of equal amplitude left-right signals) by means of biasing resistors 101 and 102, respectively, which are grounded at their junction point and which are supplied with direct current through an adjustable tap 103 on a resistor 104. Moving the tap 103 increases the bias on one amplified tube and decreases it on the other amplifier tube.

The bias circuit for the tube 93 may be traced from the bias resistor 101 through the output resistor 91 and the filter resistor 92 to the grid of tube 93, and from the cathode of tube 93 through the load resistor 96 to ground. The bias circuit for the tube 94 may be traced from the bias resistor 102 through a filter resistor 106 to the grid of the tube 94, and from the cathode of tube 94 through the load resistor 96 to ground.

At the diode input circuit a resistor 107 is connected from the variable tap 86 either directly to ground or to ground through the bias resistor 101 as illustrated for providing a D.-C. circuit or path for the diodes 37 and 38.

Across the input electrodes of the amplifier tubes 93 and 94 there are filter capacitors 108 and 109, respectively, whereby the square wave voltages produced at the output resistor 91 by the left-right switching are converted to their average direct current for controlling the D.-C. output of tubes 93 and 94.

In operation, if one of the left-right signals is of greater amplitude than the other, the D.-C. voltage on the grid of tube 93 driven from output resistor 91 will be different than the D.-C. voltage on the cathode of tube 94 driven from load resistor 96 whereby the motor 69 (Fig. 1) will be rotated in the proper direction to point the antennas T₁ and T₂ toward the target.

The switching circuit of Fig. 5 is the same as that shown in Fig. 4 except that the diode switching is done in the diode output circuit instead of in the diode input circuit.

In Fig. 6 the signal from the audio amplifier 31 (Fig. 1) is applied to a suitable detector such as a grid biased tube 121 whereby its plate voltage depends upon the amplitude of the beat frequency or audio signals produced during each antenna switching period. Therefore, if the left-right received signals are of unequal amplitude, there will be a square wave component in the detector output, its frequency being equal to the switching rate. The filter 122 filters out the audio frequency components.

The square wave component is applied through a coupling capacitor 123 to the amplifier tube 61 to produce a square wave current component in the anode circuit of tube 61. The anode of tube 61 is connected alternately by means of the switch arm 53 to the marginal relays 67 and 68 which are shunted by filter capacitors 124 and 126, respectively, to keep the relays from chattering. The relays 67 and 68 operate as in Fig. 1 to control the motor 69 (Fig. 1).

In Fig. 7 the output of audio amplifier 31 (Fig. 1) is applied to a suitable detector such as a grid lead biased detector 131 having a grid capacitor 132 and a grid leak resistor 133. With this particular type of detector, the greater the amplitude of the beat frequency or audio signal, the smaller the D.-C. anode current of the tube 131 becomes. Therefore, if the signals received during the two antenna switching periods are of unequal amplitude, there will be a square wave voltage component in the detector output having a frequency equal to the switching rate.

The switch arm 53 applies voltage to the control grids of amplifier tubes 136 and 137 during alternate half cycles of the square wave voltage through filter resistors 138 and 139, respectively. Filter capacitors 141 and 152 are connected from the grid ends of resistors 138 and 139, respectively, to ground. Input resistors 143 and 144 are connected from the input ends of resistors 138 and 139, respectively, to ground.

The capacity of the coupling capacitor 135 is large enough so that its charge does not change appreciably during a left-right switching cycle and the average voltage at the switch arm 53 will be ground potential. The voltage difference of the voltages applied to the control grids of the tubes 136 and 137 will be the voltage difference of the detector output during the left switching period and the detector output during the right switching period. If the directive antenna system is pointed directly toward the target, these two outputs will be equal, the currents flowing through the relay coils 146 and 147 of a differential relay will be equal, and the relay armature 148 will be in its center position whereby the motor 69 (Fig. 1) is not energized. If the amplitudes of the two signals are unequal, the motor 69 will be run in one direction or the other according to whether the relay armature 148 is on the upper or the lower contact point.

If it is desired to apply the present invention to an aircraft that is to be flown without a pilot, i. e., to apply it to a drone, the aircraft may be held at a predetermined altitude by means of a system such as described and claimed in the copending application Serial No. 484,458, filed April 24, 1943, in the names of Roydon C. Sanders, Jr., and John H. Purl, and entitled Aircraft control system, which issued as Patent No. 2,443,748 on June 22, 1948.

In the drawing various voltages and circuit values have been given merely by way of example. The values are given in ohms, thousands of ohms and megohms and in microfarads, the letter M indicating where ohms are given in thousands.

I claim as my invention:

1. In combination, a radio locator system of the frequency-modulated type comprising a transmitter for transmitting a cyclically frequency modulated radio signal to a signal reflecting object and a receiver including a beat detector for receiving both said signal after reflection from said target and a heterodyning signal direct from said transmitter, said system also comprising a directive antenna system and means for angularly displacing its region of maximum field strength during successive switching periods to each side of the region defining the equisignal axis, a rectifier connected to rectify the beat frequency output of said receiver, switching means which is synchronous with said antenna field displacement for making the output of said rectifier appear as a square wave voltage having an alternating-current axis at a certain voltage level when the region defining the equi-signal axis is directed toward a target and at one side thereof and as a square wave voltage having an alternating-current axis at a different voltage level when said region defining the equi-signal axis is directed to the opposite side of said target, a reversible motor, relay means for controlling the direction and amount of rotation of said motor in accordance with said square wave, means for controlling the direction in which said equi-signal axis region is pointed, and a servo connection between said motor and said last means for turning said equi-signal axis region toward said target in response to said equi-signal axis region pointing to one side of said target.

2. In combination, a radio locator system of the frequency-modulated type comprising a transmitter for transmitting a cyclically frequency modulated radio signal to a signal reflecting object and a receiver including a beat detector for receiving both said signal after reflection from said target and a heterodyning signal direct from said transmitter, said system also comprising a directive antenna system and means for angularly displacing its region of maximum field strength during successive switching periods to each side of the region defining the equi-signal axis, a rectifier connected to rectify the beat frequency output of said receiver, switching means which is synchronous with said antenna field displacement for making the output of said rectifier appear as a square wave voltage having an alternating-current axis at a certain voltage level when the region defining the equi-signal axis is directed toward but to one side of a target and as a square wave voltage having an alternating-current axis at a different voltage level when said region defining the equi-signal axis is directed to the opposite side of said target, means for maintaining synchronism between said antenna field displacement and said cyclic frequency modulation of the transmitter, a reversible motor, relay means for controlling the direction and amount of rotation of said motor in accordance with said square wave, means for controlling the direction in which said equi-signal axis region is pointed, and a servo connection between said motor and said last means for turning said equi-signal axis region toward said target in response to said equi-signal axis region pointing to one side of said target.

3. In combination, a radio locator system of the frequency-modulated type comprising a transmitter for transmitting a cyclically frequency modulated radio signal to a signal reflecting object and a receiver including a beat detector for receiving both said signal after reflection from said target and a heterodyning signal direct from said transmitter, said transmitter including means for producing a triangular wave and means for cyclically frequency modulating the transmitter by said wave, said system also comprising a directive antenna system and means for angularly displacing its region of maximum field strength during successive switching periods to each side of the region defining the equi-signal axis, a rectifier connected to rectify the beat frequency output of said receiver, switching means which is synchronous with said antenna field displacement for making the output of said rectifier appear as a square wave voltage having an alternating-current axis at a certain voltage level when the region defining the equi-signal axis is directed toward but to one side of a target and as a square wave voltage having an alternating-current axis at a different voltage level when said region defining the equi-signal axis is directed to the opposite side of said target, means for synchronizing said antenna field displacement with said frequency modulation to modulate the transmitter by one triangular wave during each displacement of the antenna field to one side of the target, a reversible motor, relay means for controlling the direction and amount of rotation of said motor in accordance with said square wave, means for controlling the direction in which said equi-signal axis region is pointed, and a servo connection between said motor and said last means for turning said equi-signal axis region toward said target in response to said equi-signal axis region pointing to one side of said target.

4. In a system for automatically directing an object in flight towards a target, a radio locator system of the frequency-modulated type carried by said object and comprising a transmitter for transmitting a cyclically frequency modulated radio signal to the target and a receiver including a beat detector for receiving said signal after reflection from said target, said system also comprising a directive antenna system and means for angularly displacing its region of maximum field strength during successive left-right switching periods to each side of the region defining the equi-signal axis, a rectifier connected to rectify the output of said receiver, switching means which is synchronous with said antenna switching for making the output of said rectifier appear as a square wave voltage having an alternating-current axis at a certain voltage level when the region defining the equi-signal axis is directed toward but to one side of a target and as a square wave voltage having an alternating-current axis at a different voltage level when said region defining the equi-signal axis is directed to the opposite side of said target, a reversible motor, relay means for controlling the direction and amount of rotation of said motor in accordance with said square wave, means for controlling the direction in which said equi-signal axis region is pointed, and a servo connection between said motor and said last means for turning said equi-signal axis region toward said equi-signal axis target in response to said region pointing to one side of said target.

5. In a system for automatically directing an object in flight towards a target, a radio locator system of the frequency-modulated type carried by said object and comprising a transmitter for transmitting a cyclically frequency modulated radio signal to the target and a receiver including a beat detector for receiving said signal after reflection from said target, said system also comprising a directive antenna system and means for angularly displacing its region of maximum field strength during successive left-right switching periods to each side of the region defining the equi-signal axis, a rectifier connected to rectify the output of said receiver, switching means which is synchronous with said antenna switching for making the output of said rectifier appear as a square wave voltage having an alternating-current axis at a certain voltage level when the region defining the equi-signal axis is directed toward but to one side of a target and as a square wave voltage having an alternating-current axis at a different voltage lead when said region defining the equi-signal axis is directed to the opposite side of said target, a reversible motor, relay means for controlling the direction and amount of rotation of said motor in accordance with the direct current component of said square wave, means for controlling the direction in which said equi-signal axis region is pointed, and a servo connection between said motor and said last means for turning said equi-signal axis region toward said target in response to said equi-signal axis region pointing to one side of said target.

6. In a system for automatically directing an object in flight towards a target, a radio locator system of the frequency-modulated type carried by said object and comprising a transmitter for transmitting a cyclically frequency modulated radio signal to the target and a receiver including a beat detector for receiving said signal after reflection from said target, said system also comprising a directive antenna system and means for angularly displacing its region of maximum field strength during successive left-right switching periods to each side of the region defining the equi-signal axis, a rectifier connected to rectify the output of said receiver, switching means which is synchronous with said antenna switching for making the output of said rectifier appear as a square wave voltage having an alternating-current axis at a certain voltage level when the region defining the equi-signal axis is directed toward but to one side of a target and as a square wave voltage having an alternating-current axis at a different voltage level when said region defining the equi-signal axis is directed to the opposite side of said target, a reversible motor, relay means for controlling the direction and amount of rotation of said motor in accordance with said square wave, means for controlling the direction in which said equi-signal axis region is pointed, a servo connection between said motor and said last means for turning said equi-signal axis region toward said target in response to said equi-signal axis region pointing to one side of said target, and follow-up means comprising means for changing the relative amplitudes of the positive and negative half cycles of said square wave to reduce the amount of said equi-signal axis turning toward said target as said region is turned toward said target.

7. In a system for automatically directing an object in flight towards a target, a radio locator system of the frequency-modulated type carried by said object and comprising a transmitter for transmitting a cyclically frequency-modulated radio signal to the target and a receiver including a beat detector for receiving said signal after reflection from said target, said system also comprising a directive antenna system and means for angularly displacing its region of maximum field strength during successive left-right switching periods to each side of the region defining the equi-signal axis, a rectifier connected to rectify the output of said receiver, switching means which is synchronous with said antenna switching for making the output of said rectifier appear as a square wave voltage having an alternating-current axis at a certain voltage level when the region defining the equi-signal axis is directed toward but to one side of a target and as a square wave voltage having an alternating-current axis at a different voltage level when said region defining the equi-signal axis is directed to the opposite side of said target, a reversible motor, relay means for controlling the direction and amount of rotation of said motor in accordance with said square wave, means for controlling the direction in which said equi-signal axis region is pointed, a servo connection between said motor and said last means for turning said equi-signal axis region toward said target in response to said equi-signal axis region pointing to one side of said target, and follow-up means comprising means for changing the relative amplitudes of the positive and negative half cycles of said square wave sufficiently to reverse said motor before said equi-signal axis region is turned toward said target to reduce the amount said object is turned toward said target.

8. In a system for automatically directing an object in flight towards a target, a radio locator system of the frequency-modulated type carried by said object and comprising a transmitter for transmitting a cyclically frequency-modulated radio signal to the target and a receiver including a beat detector for receiving said signal after reflection from said target, said system also comprising a directive antenna system and means for angularly displacing its region of maximum field strength during successive left-right switching periods to each side of the region defining the equi-signal axis, a pair of rectifiers connected to rectify the output of said receiver, each rectifier having a cathode and an anode, switching means which is synchronous with said antenna switching for making the output of said pair of rectifiers appear as a square wave voltage having an alternating-current axis at a certain voltage level when the region defining the equi-signal axis is directed toward but to one side of a target and as a square wave voltage having an alternating-current axis at a different voltage level when said region defining the equi-signal axis is directed to the opposite side of said target, a reversible motor, relay means for controlling the direction and amount of rotation of said motor in accordance with said square wave, means for controlling the direction in which said equi-signal axis region is pointed, a servo connection between said motor and said last means for turning said equi-signal axis region toward said equi-signal axis target in response to said region pointing to one side of said target, and follow-up means comprising means for changing the relative amplitudes of the positive and negative half cycles of said square wave to reduce the amount of said turning toward said target as said equi-signal axis region is turned toward said target, said follow-up means including a resistor connected between the cathode of one of said rectifiers and the anode of the other of said rectifiers, a variable tap on said resistor through which the rectifier circuits are completed, and means for moving said tap along said resistor in response to and in proportion to the rotation of said motor and in a direction to limit the rotation of the motor.

9. In a system for automatically directing an object in flight towards a target, a radio locator system of the frequency-modulated type carried by said object and comprising a transmitter for transmitting a cyclically frequency modulated radio signal to the target and a receiver including a beat detector for receiving said signal after reflection from said target, said system also comprising a directive antenna system and means for angularly displacing its region of maximum field strength during successive left-right switching periods to each side of the region defining the equi-signal axis, a rectifier connected to rectify the output of said receiver, switching means which is synchronous with said antenna switching for making the output of said rectifier appear as a square wave voltage having an alternating-current axis at a certain voltage level when the region defining the equi-signal axis is directed toward but to one side of a target and as a square wave voltage having an alternating current axis at different voltage level when said region defining the equi-signal axis is directed to the opposite side of said target, a reversible motor, relay means for controlling the direction and amount of rotation of said motor in accordance with said square wave, means for controlling the direction in which said equi-signal axis region is pointed, a servo connecton between said motor and said last means for turning said equi-signal axis region toward said target in response to said equi-signal axis region pointing to one side of said target, and anti-hunt means for applying to said relay means a control voltage that is proportional to the speed of rotation of said motor and that reverses in polarity when said motor reverses.

10. The invention according to claim 9 wherein said anti-hunt means includes a voltage divider resistor, a movable tap thereon, means for moving said tap in accordance with the speed of and the direction of rotation of said motor, and a capacitor connected between said tap and said relay means to apply said control voltage thereto.

11. The invention according to claim 9 wherein said anti-hunt means includes a voltage divider resistor, a movable tap thereon, means for increasing the voltage across said resistor in response to an increase in the strength of the received signal, means for moving said tap in accordance with the speed of and the direction of rotation of said motor, and a capacitor connected between said tap and said relay means to apply said control voltage thereto.

12. In combination, a radio locator system comprising a transmitter for transmitting a radio signal to a reflecting object and a receiver for receiving said signal after reflection from said object, said system also comprising a directive antenna system and means for angularly displacing its region of maximum field strength during successive switching periods to each side of the region defining the equi-signal axis, a rectifier connected to rectify the output of said receiver during one of said switching periods, an output impedance unit for said rectifier, switching means for making said rectifier pass current through said impedance unit during said one antenna switching period, means for establishing a comparison voltage during the next antenna switching period whereby a square wave voltage having an alternating-current axis at a certain voltage level appears across said output impedance unit when the region defining the equi-signal axis is directed toward but to one side of said reflecting object and whereby a square wave voltage having an alternating-current axis at a different voltage level appears across said impedance unit when said region defining the equi-signal axis is directed to the opposite side of said reflecting object, a filter connected to smooth out said square wave to obtain its direct-current component, a reversible motor, relay means for controlling the direction and amount of rotation of said motor in accordance with the direct-current output of said filter, means for controlling the direction in which said equi-signal axis region is pointed, and a servo connection between said motor and said last means for turning said antennas toward said reflecting object in response to said equi-signal axis region pointing to one side of said object.

13. In combination, a radio locator system comprising a transmitter for transmitting a radio signal to a reflecting object and a receiver for receiving said signal after reflection from said object, said system also comprising a directive antenna system and means for angularly displacing its region of maximum field strength during successive switching periods to each side of the region defining the equi-signal axis, a pair of rectifiers connected to rectify the output of said receiver, an output impedance unit for said rectifiers, switching means for making one of said rectifiers pass current through said impedance unit during one antenna switching period and for making the other of said rectifiers pass current in the opposite direction through said impedance unit during the next antenna switching period whereby a square wave voltage having an alternating-current axis at a certain voltage level appears across said output impedance unit when the region defining the equi-signal axis is directed toward but to one side of said object and whereby a square wave voltage having an alternating-current axis at a different voltage level appears across said impedance unit when said region defining the equi-signal axis is directed to the opposite side of said reflecting object, a filter connected to smooth out said square wave to obtain its direct-current component, a reversible motor, relay means for controlling the direction and amount of rotation of said motor in accordance with the direct-current output of said filter, means for controlling the direction in which said equi-signal axis region is pointed, and a servo connection between said motor and said last means for turning said antennas toward said reflecting object in response to said equi-signal axis region pointing to one side of said object.

14. In a system for automatically directing an object in flight towards a target, a radio locator system carried by said object and comprising a transmitter for transmitting a radio signal to the target and a receiver for receiving said signal after reflection from said target, said system also comprising a directive antenna system and means for angularly displacing its region of maximum field strength during successive left-right switching periods to each side of the region defining the equi-signal axis, a pair of rectifiers connected to rectify the output of said receiver, an output impedance unit for said rectifiers, switching means for making one of said rectifiers pass current through said impedance unit during one antenna switching period and for making the other of said rectifiers pass current in the opposite direction through said impedance unit during the next antenna switching period whereby a square wave voltage having an alternating-current axis at a certain voltage level appears across said output impedance unit when the region defining the equi-signal axis is directed toward but to one side of a target and whereby a square wave voltage having an alternating-current axis at a different voltage level appears across said impedance unit when said region defining the equi-signal axis is directed to the opposite side of said target, a filter connected to smooth out said square wave to obtain its direct-current component, a reversible motor, relay means for controlling the direction and amount of rotation of said motor in accordance with the direct-current output of said filter, means for controlling the direction in which said equi-signal axis region is pointed, and a servo connection between said motor and said last means for turning said equisignal axis region toward said target in response to said equi-signal axis region pointing to one side of said target.

15. In combination, a radio locator system comprising a transmitter for transmitting a radio signal to a reflecting object and a receiver for receiving said signal after reflection from said object, said system also comprising a pair of directive antennas having overlapping radiation patterns, switching means for switching said antennas successively to said system during successive switching periods, a pair of rectifiers connected to rectify the output of said receiver, an output impedance unit for said rectifiers, switching means for making one of said rectifiers pass current through said impedance unit during one antenna switching period and for making the other of said rectifiers pass current in the opposite direction through said impedance unit during the next antenna switching period whereby a square wave voltage having an alternating-current axis at a certain voltage level appears across said output impedance unit when said pair of antennas are directed toward but to one side of said reflecting object and whereby a square wave voltage having an alternating-current axis at a different voltage level appears across said impedance unit when said pair of antennas are directed to the opposite side of said reflecting object, a filter connected to smooth out said square wave to obtain its direct-current component, a reversible motor, relay means for controlling the direction and amount of rotation of said motor in accordance with the direct-current output of said filter, means for controlling the direction in which said pair of antennas are pointed, and a servo connection between said motor and said last means for turning said antennas toward said reflecting object in response to said antennas pointing to one side of said target.

16. In combination, a radio locator system comprising a transmitter for transmitting a radio signal to a reflecting object and a receiver for receiving said signal after reflection from said object, said system also comprising a pair of directive antennas having overlapping radiation patterns, switching means for switching said antennas alternately to said system so that one of said antennas is connected to said system during one switching period and the other of said antennas is connected to said system during the next switching period, a pair of rectifiers and an output impedance unit for said rectifiers, each of said rectifiers being connected to rectify the output of said receiver, said rectifiers being connected in opposite directions to produce current flow in opposite directions through said output impedance unit, switching means for making one of said rectifiers pass current during one antenna switchinig period and for making the other of said rectifiers pass current during the next antenna switching period, whereby a square wave voltage having an alternating-current axis at a certain voltage level appears across said output impedance unit when the line bisecting the angle between said antennas and representing equal field strength therefor is directed to one side of said reflecting object and whereby a square wave voltage having an alternating-current axis at a certain voltage level appears across said impedance unit when said line of equal field strength is directed to the opposite side of said reflecting object, a filter connected to smooth out said square wave to obtain its direct-current component, an amplifier tube to which the direct-current output of said filter is applied, a reversible motor, relay means for controlling the direction and amount of rotation of said motor in accordance with the direct-current output of said amplifier tube, means for controlling the direction in which said line of equal field strength of the antennas is pointed, and a servo connection between said motor and said last means for turning said antennas so that their line of equal field strength is turned toward said reflecting object in response to said line pointing to one side of said target.

ROYDEN C. SANDERS, Jr.

REFERENCES CITED

The following references are of record in the file of this patent:

UNITED STATES PATENTS

| Number | Name | Date |
| --- | --- | --- |
| 2,176,469 | Moueix | Oct. 17, 1939 |
| 2,427,029 | Stearns | Sept. 9, 1947 |